United States Patent
Owens, Jr. et al.

(10) Patent No.: US 8,217,631 B2
(45) Date of Patent: Jul. 10, 2012

(54) ACG OUTPUT VOLTAGE CONTROL

(75) Inventors: C. Richard Owens, Jr., Powell, OH (US); Tadashi Fujiwara, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 242 days.

(21) Appl. No.: 12/388,196

(22) Filed: Feb. 18, 2009

(65) Prior Publication Data

US 2009/0184692 A1    Jul. 23, 2009

(51) Int. Cl.
*H02P 11/00* (2006.01)
*H02P 9/00* (2006.01)

(52) U.S. Cl. ............................ 322/44; 322/17

(58) Field of Classification Search ............ 322/44, 322/59, 89, 24, 17, 28; 320/124, 140, 155, 320/163; 307/10.3
See application file for complete search history.

(56) References Cited

U.S. PATENT DOCUMENTS

| | | | |
|---|---|---|---|
| 1,434,728 A * | 11/1922 | Morton et al. | ............... 320/123 |
| 3,820,009 A | 6/1974 | Itoh et al. | |
| 3,876,931 A | 4/1975 | Godshalk | |
| 4,137,557 A | 1/1979 | Ciarniello et al. | |
| 4,390,828 A | 6/1983 | Converse et al. | |
| 4,396,880 A | 8/1983 | Windebank | |
| 4,424,477 A | 1/1984 | Enoshima et al. | |
| 4,527,112 A | 7/1985 | Herman | |
| 4,766,862 A | 8/1988 | Hibino et al. | |
| 4,848,700 A | 7/1989 | Lockheed | |
| 4,852,540 A | 8/1989 | Safranek | |
| 4,902,956 A | 2/1990 | Sloan | |
| 5,087,869 A | 2/1992 | Kuriyama et al. | |
| 5,204,992 A | 4/1993 | Carpenter | |
| 5,214,385 A | 5/1993 | Gabriel et al. | |
| 5,235,946 A | 8/1993 | Fodale et al. | |
| 5,272,380 A | 12/1993 | Clokie | |
| 5,280,232 A | 1/1994 | Kohl et al. | |
| 5,293,076 A | 3/1994 | Fukui | |
| 5,295,078 A | 3/1994 | Stich et al. | |
| 5,298,797 A | 3/1994 | Redl | |
| 5,300,874 A | 4/1994 | Shimamoto et al. | |
| 5,332,958 A | 7/1994 | Sloan | |
| 5,343,137 A | 8/1994 | Kitaoka et al. | |

(Continued)

FOREIGN PATENT DOCUMENTS

JP    2006101587    4/2006

(Continued)

OTHER PUBLICATIONS

U.S. Appl. No. 12/017,882, filed Jan. 22, 2008, Owens, et al.

(Continued)

*Primary Examiner* — Julio Gonzalez
(74) *Attorney, Agent, or Firm* — Mark E. Duell; Rankin Hill & Clark LLP

(57) ABSTRACT

A system provides generator control for a power system within a vehicle. The system includes a battery, a generator that outputs power to charge the battery. A sensor detects a state of charge (SOC) value, a health value, a voltage, a current, a temperature, and a charging voltage of the battery. A controller controls a voltage output mode of the generator in response to at least one of a state of charge (SOC) value, a health value, a voltage, a current, a temperature, and a charging voltage of the battery detected by the sensor, the voltage output mode is in response to the SOC and the temperature of the battery.

21 Claims, 3 Drawing Sheets

U.S. PATENT DOCUMENTS

| | | |
|---|---|---|
| 5,385,126 A | 1/1995 | Matthews |
| 5,444,378 A | 8/1995 | Rogers |
| 5,450,321 A | 9/1995 | Crane |
| 5,602,462 A | 2/1997 | Stich et al. |
| 5,621,298 A | 4/1997 | Harvey |
| 5,668,465 A | 9/1997 | May |
| 5,684,370 A | 11/1997 | Watanabe |
| 5,691,619 A | 11/1997 | Vingsbo |
| 5,693,986 A | 12/1997 | Vettraino, Jr. et al. |
| 5,699,050 A | 12/1997 | Kanazawa |
| 5,717,937 A | 2/1998 | Fritz |
| 5,731,690 A | 3/1998 | Taniquchi et al. |
| 5,764,469 A | 6/1998 | Slepian et al. |
| 5,793,359 A | 8/1998 | Ushikubo |
| 5,798,577 A | 8/1998 | Lesesky et al. |
| 5,823,280 A | 10/1998 | Lateur et al. |
| 5,831,411 A | 11/1998 | Klauer et al. |
| 5,872,443 A | 2/1999 | Williamson |
| 5,896,023 A | 4/1999 | Richter |
| 5,969,624 A * | 10/1999 | Sakai et al. ............... 340/636.1 |
| 6,066,899 A | 5/2000 | Rund et al. |
| 6,081,098 A | 6/2000 | Bertness et al. |
| 6,114,775 A | 9/2000 | Chung et al. |
| 6,118,237 A | 9/2000 | Kikuchi et al. |
| 6,137,250 A | 10/2000 | Hirano et al. |
| 6,313,608 B1 | 11/2001 | Varghese et al. |
| 6,314,346 B1 | 11/2001 | Kitajima et al. |
| 6,316,914 B1 | 11/2001 | Bertness |
| 6,318,487 B2 | 11/2001 | Yanase et al. |
| 6,331,762 B1 | 12/2001 | Bertness |
| 6,401,012 B1 | 6/2002 | Aoki et al. |
| 6,429,613 B2 | 8/2002 | Yanase et al. |
| 6,476,571 B1 | 11/2002 | Sasaki |
| 6,515,456 B1 | 2/2003 | Mixon |
| 6,563,230 B2 | 5/2003 | Nada |
| 6,643,223 B2 * | 11/2003 | Fujisawa ..................... 368/204 |
| 6,700,386 B2 | 3/2004 | Egami |
| 6,752,226 B2 | 6/2004 | Naito et al. |
| 6,759,760 B2 | 7/2004 | Gaynier et al. |
| 6,766,874 B2 | 7/2004 | Naito et al. |
| 6,784,563 B2 | 8/2004 | Nada |
| 6,793,059 B2 | 9/2004 | Okada et al. |
| 6,794,765 B2 | 9/2004 | Izumiura et al. |
| 6,806,588 B2 | 10/2004 | Amano et al. |
| 6,836,718 B2 | 12/2004 | Hasfjord et al. |
| 6,871,151 B2 | 3/2005 | Bertness |
| 6,962,224 B2 | 11/2005 | Nakanowatari |
| 7,003,411 B2 | 2/2006 | Bertness |
| 7,028,796 B2 | 4/2006 | Kim |
| 7,116,078 B2 | 10/2006 | Colombo et al. |
| 7,126,341 B2 | 10/2006 | Bertness et al. |
| 7,146,959 B2 | 12/2006 | Thompson et al. |
| 7,165,638 B2 | 1/2007 | Ito et al. |
| 7,173,347 B2 | 2/2007 | Tani et al. |
| 7,228,841 B2 | 6/2007 | Takemoto et al. |
| 7,273,120 B2 | 9/2007 | Tabata |
| 7,276,806 B1 | 10/2007 | Sheidler et al. |
| 7,315,774 B2 | 1/2008 | Morris |
| 7,317,300 B2 | 1/2008 | Sada et al. |
| 7,332,881 B2 | 2/2008 | Clark et al. |
| 7,416,037 B2 | 8/2008 | Huelser et al. |
| 7,472,769 B2 | 1/2009 | Yamanaka et al. |
| 7,514,807 B2 * | 4/2009 | Donnelly et al. ........... 290/40 C |
| 7,560,882 B2 | 7/2009 | Clark et al. |
| 7,825,616 B2 | 11/2010 | Clark et al. |
| 2003/0173123 A1 | 9/2003 | Nakanowatari |
| 2003/0173124 A1 | 9/2003 | Okada et al. |
| 2003/0236599 A1 | 12/2003 | Saito et al. |
| 2004/0189254 A1 | 9/2004 | Kapsokavathis et al. |
| 2004/0263176 A1 | 12/2004 | Vonderhaar et al. |
| 2005/0024061 A1 | 2/2005 | Cox et al. |
| 2005/0068039 A1 | 3/2005 | Bertness |
| 2005/0162172 A1 | 7/2005 | Bertness |
| 2005/0285445 A1 | 12/2005 | Wruck et al. |
| 2006/0214508 A1 | 9/2006 | Binder |
| 2006/0282227 A1 | 12/2006 | Bertness |
| 2007/0069734 A1 | 3/2007 | Bertness |
| 2007/0159177 A1 | 7/2007 | Bertness et al. |
| 2007/0213891 A1 * | 9/2007 | Musser .......................... 701/22 |
| 2008/0204031 A1 * | 8/2008 | Iwane et al. ................. 324/430 |
| 2009/0184692 A1 | 7/2009 | Owens, Jr. et al. |
| 2009/0184693 A1 | 7/2009 | Owens et al. |
| 2010/0123465 A1 | 5/2010 | Owens et al. |

FOREIGN PATENT DOCUMENTS

| | | |
|---|---|---|
| WO | WO 96/11817 | 4/1996 |
| WO | 2007032382 | 3/2007 |
| WO | WO 2007/032382 A1 * | 3/2007 |

OTHER PUBLICATIONS

Office Action of U.S. Appl. No. 12/017,882 dated Jan. 11, 2011.
Office Action of U.S. Appl. No. 12/017,882 dated Jun. 21, 2011.
Office Action of U.S. Appl. No. 12/017,882 dated Jan. 20, 2012.
Office Action of U.S. Appl. No. 12/017,882 dated Oct. 12, 2011.
Office Action of U.S. Appl. No. 12/017,882 dated May 17, 2012.

* cited by examiner

ACG OUTPUT VOLTAGE CONTROL

CROSS REFERENCE TO RELATED PATENTS AND APPLICATIONS

This application claims the priority benefit of U.S. application Ser. No. 12/017,882, filed Jan. 22, 2008, the disclosure of which is incorporated herein by reference.

BACKGROUND

The present specification relates generally to the automotive arts. More specifically, the present specification relates to a control system and/or method that adjusts or otherwise regulates the output voltage of a vehicle's electric power generator in response to a detected state of charge (SOC) of the vehicle's battery. Particular application is found in connection with an electrical system of a motor vehicle (e.g., an automobile or other vehicle driven by an internal combustion engine), and the specification makes particular reference thereto. However, it is to be appreciated that aspects of the present subject matter are also amenable to other like applications.

As is known in the art, many automotive vehicles generally include an internal combustion or other like engine that drives the vehicle. A modern vehicle is also typically provisioned with an electrical system including: (i) a battery which provides a source of electric power for starting the vehicle's engine; and, (ii) one or more electric circuits or loads (e.g., headlights, clocks, electrically powered adjustable components such as seats, mirrors or steering columns, interior cabin lights, electric heaters for seats, mirrors, windows or the like, radios and/or other entertainment systems, electronic memories for recording radio station presets and/or user preferred seat and/or mirror positions, electronic navigation systems, etc.) that may also be selectively powered by the vehicle's battery. The trend of providing more electronic features and/or devices in a vehicle typically results in additional burden on the vehicle's battery and thus it becomes even more prudent to pay meaningful consideration to maintaining the health of the battery.

Typically, the vehicle's electrical system also includes an electric generator or other like, device that is driven by the engine to produce electric power when the engine is running. For example, such a device is an alternating current generator (ACG), also commonly referred to as an alternator. Generally, the generator or ACG is arranged to selectively provide electric power to the aforementioned loads and/or to charge the battery.

A conventional generator or ACG of the type typically employed in an automotive vehicle is usually free to selectively operate in and/or cycle between one of two voltage output modes, e.g., depending on the operative state of the loads and/or demand for electric power from the generator or ACG. For example, in a first or HI output voltage mode, the output voltage of the generator or ACG is typically about 14.5 volts (V), and in a second or LO output voltage mode, the output voltage of the generator or ACG is typically about 12.5 V. Accordingly, when the electric power demand is relatively high or heavy, the generator or ACG normally operates in the HI output voltage mode, and when the electric power demand is relatively low or light, the generator or ACG normally operates in the LO output voltage mode. In customary automotive applications, the generator or ACG is generally free to selectively cycle between the two modes as the electric power demanded from the generator or ACG varies, e.g., due to changes in the operative states of the various loads.

In any event, while generally acceptable, the foregoing conventional operation of the ACG or generator may still not provide for suitable maintenance of the battery at a desired SOC in all circumstances. For example, continual operation of the ACG or generator in the HI voltage output mode, can result in overcharging of the battery and/or inefficient use of the vehicle's fuel—i.e., wasted fuel. Conversely, continual operation of the ACG or generator in a LO voltage output mode, can result in insufficient electrical power generation to effectively maintain the battery's SOC at or above a desired level.

Accordingly, a new and improved system and/or method is disclosed that overcomes the above-referenced problems and others by suitably controlling the output voltage of the ACG or generator.

SUMMARY

According to one aspect, a system provides generator control for a power system within a vehicle. The system includes a battery, a generator that outputs power to charge the battery. A sensor detects a state of charge (SOC) value, a health value, a voltage, a current, a temperature, and a charging voltage of the battery. A controller controls a voltage output mode of the generator in response to at least one of a state of charge (SOC) value, a health value, a voltage, a current, a temperature, and a charging voltage of the battery detected by the sensor, the voltage output mode is in response to the SOC and the temperature of the battery.

According to another aspect, a method controls a voltage output mode of the generator in a vehicle having an engine that drives an electric power generator arranged to selectively provide electric power to an electrical load of the vehicle and to selectively charge a battery of the vehicle. A state of charge (SOC) value, a health value, a voltage, a current, a temperature, and a charging voltage of the battery are determined. A voltage output mode of the generator is controlled in response to at least one of a state of charge (SOC) value, a health value, a voltage, a current, a temperature, and a charging voltage of the battery detected by the sensor, the voltage output mode is in response to the SOC and the temperature of the battery.

According to still another aspect, a system for controlling a voltage output mode of the generator is used in a vehicle having an engine that drives an electric power generator arranged to selectively provide electric power to an electrical load of the vehicle and to selectively charge a battery of the vehicle. Means are employed to detect a state of charge (SOC) value, a health value, a voltage, a current, a temperature, and a charging voltage of the battery. Means are used to control a voltage output mode of the generator in response to at least one of a state of charge (SOC) value, a health value, a voltage, a current, a temperature, and a charging voltage of the battery detected by the sensor, the voltage output mode is in a linear response to SOC of the battery.

DETAILED DESCRIPTION

Figure 1:
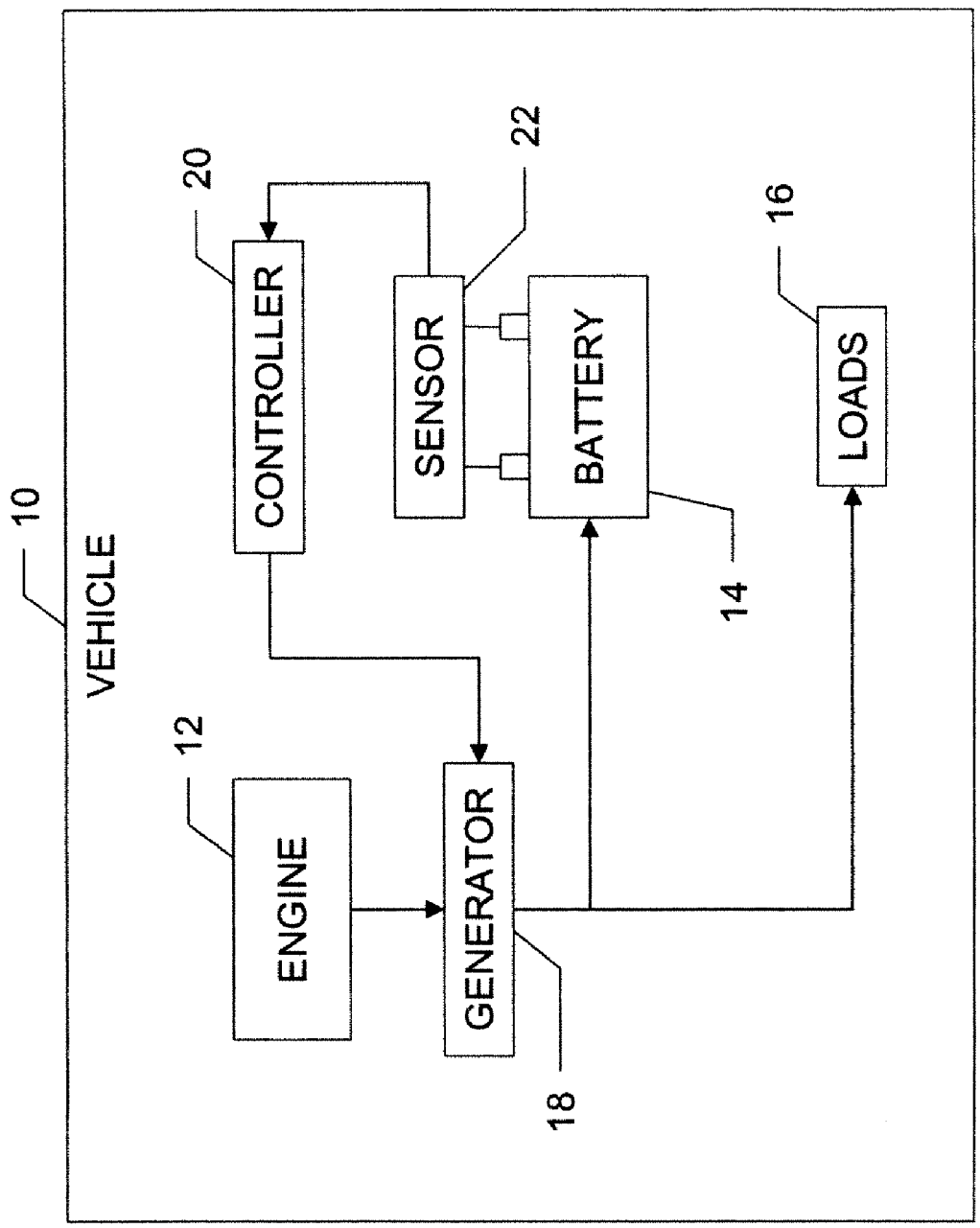
FIG. 1 is a schematic diagram showing an exemplary electric generator output voltage control system of a vehicle suitable for practicing aspects of the present disclosed subject matter.

Referring now to the drawings, wherein the showings are for purposes of illustrating one or more exemplary embodiments, FIG. 1 shows a schematic diagram of an electric generator control system for a vehicle 10, e.g., such an automobile or other similar automotive vehicle. As shown, the vehicle 10 includes an engine 12 (e.g., an internal combustion engine or the like) that drives the vehicle 10. The vehicle 10 is also provisioned with an electrical system including: a battery 14 which suitably provides a source of electrical power for starting the vehicle 10; and, one or more electric circuits or loads that may also be selectively powered by the vehicle's battery 14. As illustrated in FIG. 1, the loads are collectively represented by box 16 and may include, e.g., headlights, clocks, electrically powered adjustable components such as seats, mirrors or steering columns, interior cabin lights, electric heaters for seats, mirrors, windows or the like, radios and/or other entertainment systems, electronic memories for recording radio station presets and/or user preferred seat and/or mirror positions, electronic navigation systems, etc. Suitably, the battery is a nominal 12 volt (v) battery of the type commonly employed in automobiles or may be any other type of battery, e.g., typically used in automotive applications.

The vehicle 10 also includes an electric generator 18 (e.g., an ACG or alternator or other like device commonly known and/or employed in the automotive arts) that is driven by the engine 12 to produce electric power when the engine 12 is running. In the illustrated embodiment, the ACG 18 is arranged to selectively provide electric power to the loads 16 and/or to charge the battery 14.

Suitably, the generator 18 is the type typically employed in an automotive vehicle and under normal operating conditions (i.e., when the battery SOC is at or near a desired level or within a desired range) the generator 18 is free to selectively operate in and/or cycle between one of two voltage output modes, e.g., depending on the operative state of the loads 16 and/or demand for electric power from the generator 18. For example, in a first or HI output voltage mode, the output voltage of the generator 18 is typically about 14.5 V, and in a second or LO output voltage mode, the output voltage of the generator 18 is typically about 12.5 V. Optionally, these voltage values may vary, e.g., depending on the internal or other temperature of the generator 18. In a suitable embodiment, under normal operating conditions, when the electric power demand is relatively high or heavy, the generator 18 generally operates in the HI output voltage mode, and when the electric power demand is relatively low or light, the generator 18 generally operates in the LO output voltage mode. That is to say, under normal operating conditions, the generator 18 is generally free to selectively cycle between the two modes as the electric power demanded from the generator 18 varies, e.g., due to changes in the operative states of the loads 16.

In another embodiment, the generator responds to load requirements by providing an output based on particular requirements of the loads 16 and/or battery 14. The generator 18 receives a strength of charge value and a battery health value from the battery sensor 22 in addition to a temperature value of the battery 14. Previous embodiments have operated under the assumption that the temperature of the controller is correlated to the temperature of the battery. This, however, might not always be true. Accordingly, in contrast to the previous embodiment, there is no reliance on the temperature of the generator 18 to provide an appropriate controller output.

The controller 20 utilizes a predetermined algorithm to compare a charging voltage from the sensor 22 with an output from a charge/discharge logic algorithm to relate a particular output for the generator 18. The charge/discharge logic algorithm receives the strength of charge and the battery health values from the battery sensor 22. The algorithm calculates a value that is commensurate with any number of factors including vehicle model, battery type, battery chemistry, etc. In this manner, a determination can be made as to whether charging is warranted and, if so, the voltage level associated therewith.

The logic algorithm output is compared to a charging voltage value from the battery sensor 22. The charging voltage value includes voltage compensation as it relates to the temperature of the battery 14. Once this comparison is made, an output is sent to the generator 18 to provide an appropriate linear charge to accommodate the requirements of the loads 16 and battery 18. In this manner, the generator 18 can provide an appropriate charge to the load 16 based on actual battery temperature in addition to battery strength of charge and health. It is to be appreciated that the output of the controller 20 in concert with the second embodiment described above can utilize both a high and a low output voltage modes. The linear output of the generator to the battery can be applied during a state when the strength of charge of the battery is outside both the high and low threshold levels.

The high/low set points can be based on any number of factors including vehicle fuel economy, battery type and/or battery model. Communication from the controller 20 to the generator 18 can be facilitated via substantially any protocol or standard including transistor-transistor logic, 24 volt DC, serial output, etc. In one approach, the communication utilized between the controller 20 and the generator 18 is dictated by the protocol of the generator 18. The generator can have a plurality (e.g., 256, 512, etc.) of distinct levels related to particular load requirements. In this manner, the output of the generator 18 is not restricted to one of two levels (e.g., high/low). Instead, the generator 18 can output a plurality of disparate voltages that correlate to specific variable load requirements.

The controller 20 can additionally include a particular voltage setting to provide an appropriate output for the generator 18. The voltage can be set as either a high mode or a low mode, which is dependent on the particular battery type. In one example, the high mode is equivalent to an optimal battery charging voltage and a low mode is equal to the optimal battery charging voltage minus a constant (such as approximately 1.7 volts). The value of the optimal battery charging voltage and the constant can be battery specific and vary from one manufacture type and/or model to another.

Suitably, the generator control system includes the controller 20 that regulates and/or otherwise controls the output voltage of the generator 18 in response to the SOC of the battery 14. As shown, the SOC of the battery 14 is obtained by the controller 20 from a sensor unit or sensor 22 that is electrically and/or otherwise operatively connected to the battery 14 so as to sense and/or otherwise detect the SOC of the battery 14. That is to say, in the illustrated embodiment, the generator control system also suitably includes a SOC sensor 22 that senses, detects and/or otherwise determines a SOC or condition of the battery 14 and communicates this information to the controller 20 which in turn controls the operating mode of the generator 18 based on the received information.

More specifically, for example, the controller 20 receives a signal representative of a condition or SOC of the battery 14 from the sensor 22. In the illustrated embodiment, the sensor 22 is electrically connected to the battery 14 for determining the SOC and/or condition of the battery 14 and generating an SOC signal representative thereof to send to the controller 20. The SOC signal can be one or more signals that indicate the condition or SOC of the battery 14. The condition can be a value indicating the charge remaining in the battery 14 relative to a scale ranging between a low end where no charge remains in the battery 14 and a high end where the battery 14 is fully charged. In one suitable embodiment, the SOC signal indicates the condition of the battery 14 as related to its overall charge capacity (i.e., a value or percentage of a maximum SOC of the battery 14). In another exemplary embodiment, the SOC signal indicates the percentage of maximum electrical energy output of the battery 14.

In either event, suitably the sensor 22 measures or otherwise detects any one or more of a variety of different factors and/or parameters from which the battery's SOC is calculated or otherwise determined. These factors or parameters suitably include but are not limited to, the battery voltage, battery current, charge balance, battery temperature, etc. In practice, any of a variety of well known or otherwise appropriate methods and/or algorithms may optionally be used to calculate or determine the SOC from the respective parameters measured or otherwise obtained by the sensor 22.

Generally, based on the SOC or condition of the battery 14 or more specifically the SOC signal received from the sensor 22, the controller 20 regulates or otherwise controls the operation of the generator 18. In particular, if the SOC is outside a set or otherwise determined range, then controller 20 sends or otherwise provides a control signal or the like to the generator 18 to thereby force, induce or otherwise compel the generator 18 to operate in a particular one of the two operating modes, i.e., HI or LO. Alternately, if the SOC is within the set or determined range, then the controller 20 allows the generator 18 to operate normally, i.e., to freely switch or cycle between the HI and LO operating modes selectively in accordance with otherwise normal operating conditions.

For example, if the SOC is at or above a first threshold (TH1) (e.g., approximately 98%), then the controller 20 outputs a control signal to the generator 18 which forces or instructs or otherwise controls the generator 18 so that the generator 18 operates in the LO voltage output mode. Alternately, if the SOC is at or below a second threshold (TH2) (e.g., approximately 80%), then the controller 20 outputs a control signal to the generator 18 which forces or instructs or otherwise controls the generator 18 so that the generator 18 operates in the HI voltage output mode. Otherwise, if the SOC is in-between the first and second thresholds, then in one embodiment the controller 20 outputs no control signal to the generator 18 thereby allowing the generator 18 to operate in its normal manner, i.e., freely switching or cycling between the HI and LO voltage output modes. In another embodiment, if the SOC is in-between the first and second thresholds, then the controller 20 may still output a control signal to the generator 18 which in this instance instructs or otherwise allows the generator 18 to operate in its normal manner, again, freely switching or cycling between the HI and LO voltage output modes.

While the values of 98% and 80% have been referred to herein with regard to the thresholds TH1 and TH2, respectively, it is to be appreciated that these values are merely examples. In practice, other suitable threshold values for TH1 and/or TH2 may be used, e.g., depending on the particular application, the specific battery type and/or as otherwise desired. For example, TH1 may optionally be in the approximate range of 98% to 102% for a VRLA (valve-regulated lead acid) or AGM (absorbent glass mat) type battery. Alternately, in the case of a flooded lead acid type battery, TH1 may optionally be in the approximate range of 100% to 110%. Suitably, the actual threshold values may depend, e.g., on the vehicle and/or electrical system parameters associated with a particular application.

Figure 2:
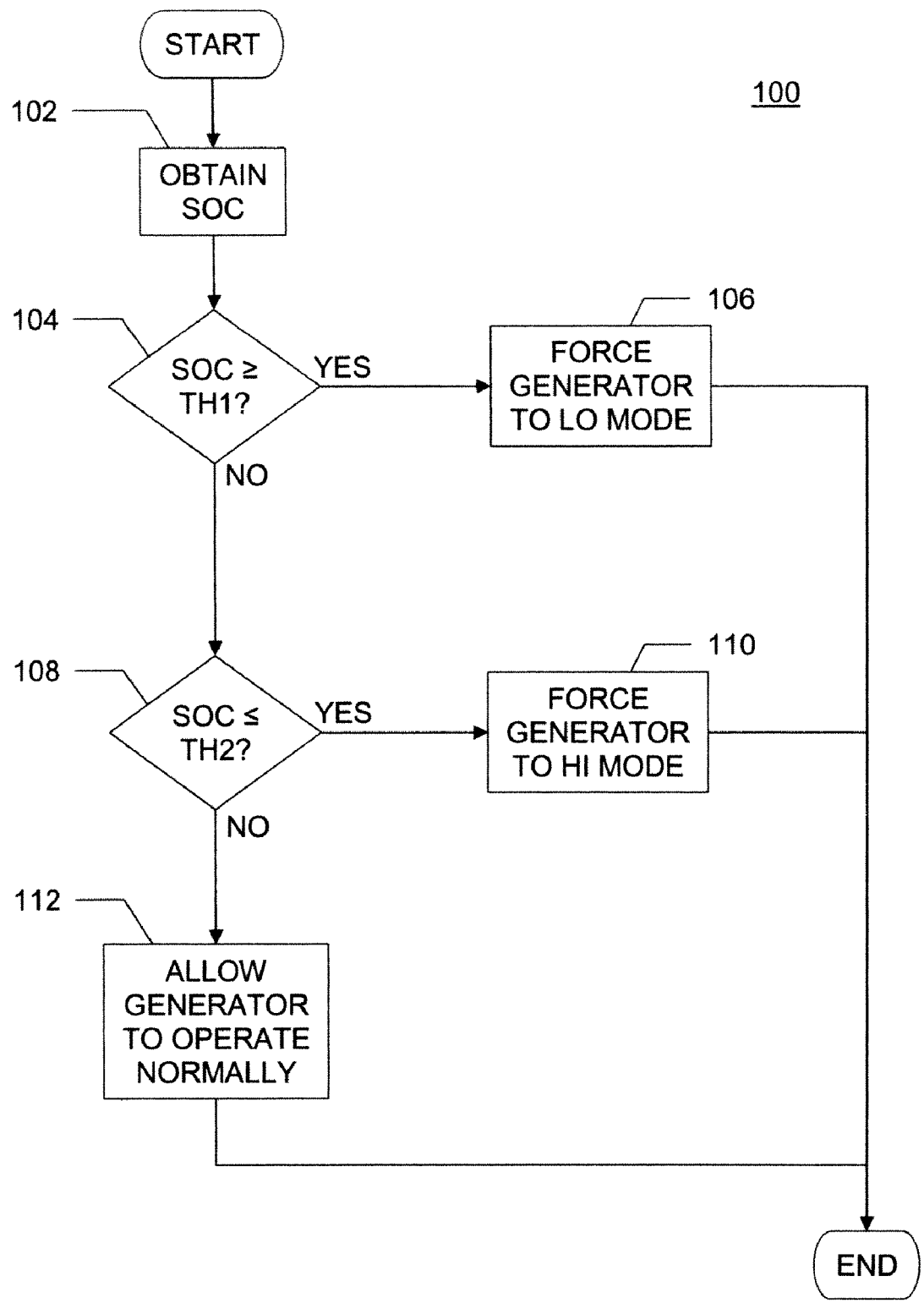
FIG. 2 is a flow chart showing an exemplary process for controlling an electric generator's output voltage in accordance with aspects of the present disclosed subject matter.

With reference now to FIG. 2, there is shown an exemplary process 100 executed by the controller 20 for selectively controlling the voltage output mode of the generator 18 based upon the SOC or condition of the battery 14 sensed or detected by the sensor 22.

In the illustrated example, at step 102, the controller 20 obtains the SOC of the battery 14 from the sensor 22. In turn, at decision step 104, the controller 20 compares the SOC obtained in step 102 to the first threshold TH1. If the SOC is at or above the first threshold (i.e., if SOC≧TH1), then the process 100 branches to step 106, otherwise if the SOC is below the first threshold (i.e., if SOC<TH1), then the process 100 continues to step 108.

At step 106, the controller 20 outputs a control signal or the like to the generator 18 which compels or instructs the generator 18 to operate in the LO voltage output mode and the process 100 then ends.

At decision step 108, the controller 20 compares the SOC obtained in step 102 to the second threshold TH2. If the SOC is at or below the second threshold (i.e., if SOC≦TH2), then the process 100 branches to step 110, otherwise if the SOC is above the second threshold (i.e., if SOC>TH2), then the process 100 continues to step 112.

At step 110, the controller 20 outputs a control signal or the like to the generator 18 which compels or instructs the generator 18 to operate in the Hi voltage output mode and the process 100 then ends.

In one suitable embodiment, at step 112, the controller 20 outputs no control signal to the generator 18 thereby allowing the generator 18 to operate in its normal manner, i.e., freely switching or cycling between the HI and LO voltage output modes. Alternately, in another suitable embodiment, at step 112, the controller 20 outputs a control signal or the like to the generator 18 instructing the generator 18 to operate in its normal manner, again, freely switching or cycling between the HI and LO voltage output modes. In either case, as shown in the illustrated embodiment, following step 112, the process 100 ends.

Of course, in one exemplary embodiment, the controller 20 optionally repeats the process 100 from time-to-time in order to periodically or intermittently control the operating mode of the generator 18 over time, e.g., as the SOC of the battery 14 may vary from time-to-time. For example, in one suitable embodiment, the process 100 is run by the controller 20 each time a new or updated SOC signal is received or obtained from the sensor 22.

Figure 3:
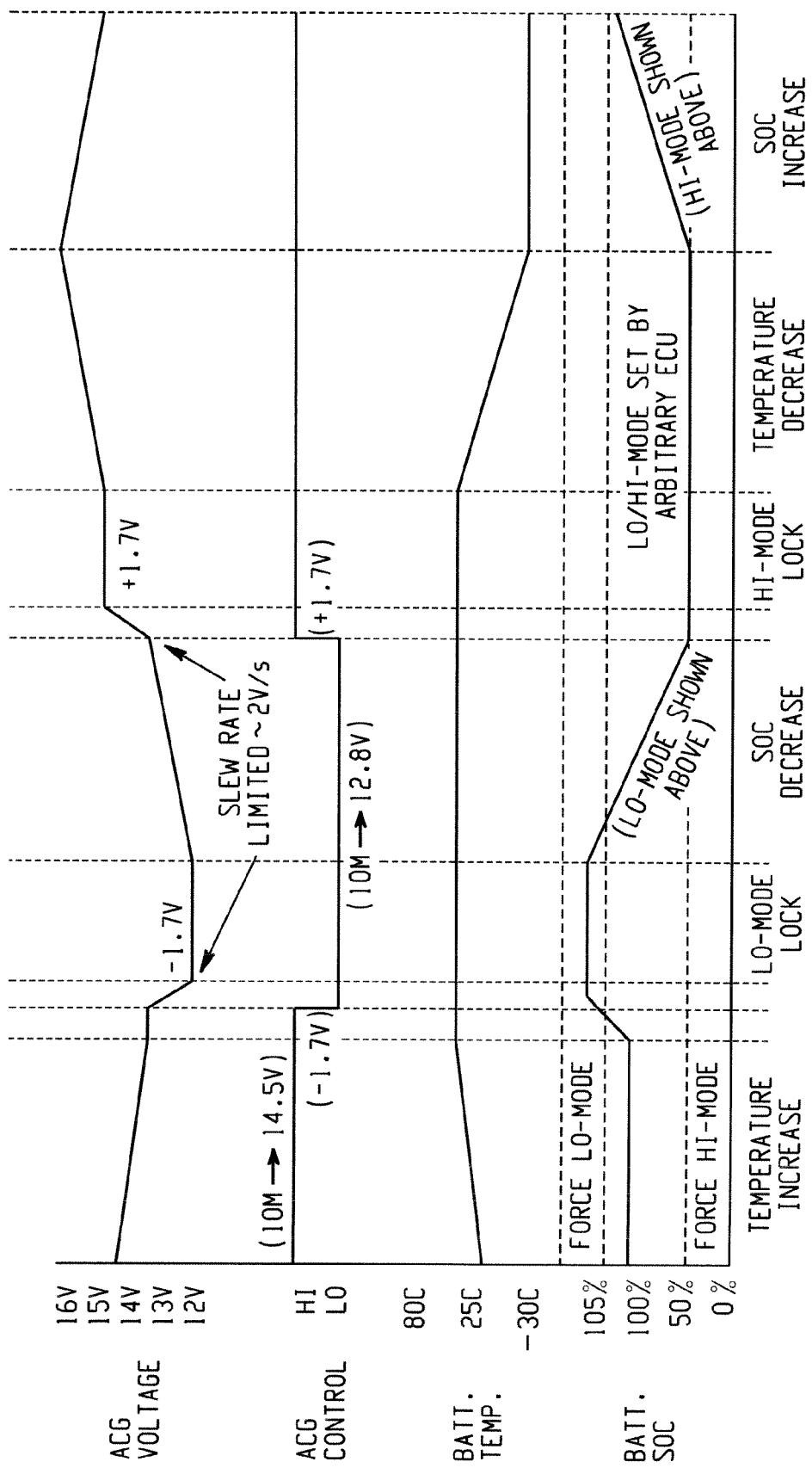
FIG. 3 is an event diagram that illustrates an electric generator's output voltage in accordance with aspects of the present disclosed subject matter.

FIG. 3 illustrates an exemplary event diagram that corresponds to specific output levels of the strength of charge and temperature of the battery as they relate to the voltage output and control output of the generator 18. As shown, the strength of charge of the battery can force a high or a low mode to be entered by the controller 20. In this example, when the strength of battery charge is 105% of a predetermined value, a low mode is forced. On the contrary, if the strength of charge of the battery is less than 50% a high mode can be forced, as described above. The temperature of the battery is also provided over time to illustrate the result of both a temperature increase and a temperature decrease of the battery. It is to be appreciated that other values can be employed for temperature and strength of charge of the battery 14 as they relate to voltage output and state of the generator 18.

In the first block, labeled temperature increase, as the temperature rises the voltage output of the generator 18 decreases in value. The inverse relationship between the battery temperature and the voltage output of the generator 18 can be described via a polynomial or other means that is battery specific. The control output of the generator 18 can be set via an outside control source such as a signal from the engine to facilitate greater fuel economy or to reduce engine friction.

When the control output of the generator 18 is switched from a high mode (e.g. at 14.5 volts) to a low mode (e.g. 12.8 volts) the voltage output of the generator likewise decreases by the constant amount (1.7 volts). The decrease in voltage output from the generator 18 has a particular slew rate (e.g., 2 volts/second) to prevent undesirable loading that can cause electrical devices within the vehicle to flicker or dim to provide an irregular output to a vehicle operator. It is to be appreciated that the differential between the high and low modes of the generator 18 can vary dependent on battery design and/or battery chemistry. In one example, the differential is generally about 1.7 volts for flooded-lead-acid battery types.

When the control of the generator is maintained in a high mode, the strength of charge of the battery 14 can increase to greater than a 100% value of charge. If the charge is greater than a predetermined threshold, such as 100%, a low mode can be forced to provide a lower output voltage to the battery 14. Once the low mode is entered, the output voltage 18 likewise decreases thereby decreasing the strength of charge of the battery. Once the strength of charge of the battery is below a predetermined threshold (such as 100% value of charge) the low/high mode can be set arbitrarily by the controller 20. Accordingly, once the low mode threshold has been passed, the control output of the generator 18 can freely change from a high mode to a low mode and vice versa based on one or more third party control settings.

Once the strength of charge of the battery decreases to a point below a predetermined threshold, a high mode output can be forced by the generator 18. The change from the low mode to the high mode (e.g. 1.7 volts) can have a slew rate associate therewith to avoid any deleterious loading effects, as outlined above. Once the high mode output is forced the voltage output of the generator 18 is increased to reflect the high mode output voltage value. Once the temperature of the battery 14 decreases, the output voltage of the generator 18 can increase in an inverse proportion to provide an appropriate charge to the battery 14 and loads 16. Once the battery temperature is constant at a lower value, a high output control for the generator 18 can cause the voltage output of the generator to decrease as the strength of charge or the battery increases as the control output of the generator 18 is set too high.

While one or more of the various embodiments have been described herein with reference to the battery's SOC, it is to be appreciated that SOC is merely an exemplary parameter that is sensed, measured and/or otherwise determined and accordingly used in one or more suitable manners as explained above. More generally and/or in alternate embodiments, other parameters indicative of and/or related to the battery's state of function (SOF) may similarly be obtained (i.e., sensed, measured and/or otherwise determined) and suitably used in place of the SOC. In this regard, examples of the battery's SOF include not only the battery's SOC but also the battery's cranking voltage, the internal resistance of the battery, the battery's reserve capacity, the cold cranking amperes (CCA) of the battery, the battery's health and the like. Accordingly, it is intended that the terms and/or parameters SOC and SOF when used herein may optionally be interchanged where appropriate to achieve various alternate embodiments suitable for particular desired applications.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in common elements and/or components where appropriate. For example, the sensor 22 and controller 20 may suitably be integrated together. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components descibed herein may have their functionality suitably implemented via hardware, software, firmware or a combination thereof. For example, the controller 20 and/or sensor 22 may be implemented as appropriate hardware circuits or alternately as microprocessors programmed to implement their respective functions. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A generator control system that provides generator control for a vehicle power system, comprising:
   a battery;
   a generator that outputs power to charge the battery, the generator operable in one of two modes including a HI voltage output mode and a LO voltage output mode;
   a sensor that detects a state of charge (SOC) value, a health value, a voltage, a current, a temperature, and a charging voltage of the battery; and
   a controller that controls a voltage output mode of the generator in response to at least one of a state of charge (SOC) value, a health value, a voltage, a current, a temperature, and a charging voltage of the battery detected by the sensor, the voltage output mode is in response to the SOC and the temperature of the battery, wherein the controller provides a control signal to the generator based upon the SOC detected by the sensor, said control signal instructing the generator to operate in a selected one of the two modes when the SOC is outside a determined range, and wherein the control signal instructs the generator to operate in the LO voltage output mode when the SOC is above a first predetermined fixed threshold and instructs the generator to operate in the HI voltage output mode when the SOC is below a second predetermined fixed threshold, said first predetermined fixed threshold being greater than said second predetermined fixed threshold.

2. The generator control system of claim 1, wherein the difference between the HI mode and the LO mode is approximately 1.7 volts.

3. The generator control system of claim 1, wherein the mode selected is based at least in part upon a vehicle fuel economy value and an engine friction value.

4. The generator control system of claim 1, wherein the controller utilizes a charge/discharge algorithm and a charging voltage value to output a control signal the generator.

5. A system that provides generator control for a vehicle power system, comprising:
   a battery;
   a generator that outputs power to charge the battery;
   a sensor that detects a state of charge (SOC) value, a health value, a voltage, a current, a temperature, and a charging voltage of the battery; and
   a controller that controls a voltage output mode of the generator in response to at least one of a state of charge (SOC) value, a health value, a voltage, a current, a temperature, and a charging voltage of the battery detected by the sensor, the voltage output mode is in response to the SOC and the temperature of the battery, wherein the output voltage of the generator is substantially inversely proportional to the temperature of the battery.

6. In a vehicle having an engine that drives an electric power generator arranged to selectively provide electric power to an electrical load of the vehicle and to selectively charge a battery of the vehicle, a method for controlling a voltage output mode of the generator comprising:
   determining a state of charge (SOC) value, a health value, a voltage, a current, a temperature, and a charging voltage of the battery in the vehicle with a sensor;
   receiving at a controller from the sensor the state of charge (SOC), the health valve, the voltage, the current, the temperature and the charging voltage of the battery; and
   controlling a voltage output mode of the generator with the controller in response to at least one of a state of charge (SOC) value, a health value, a voltage, a current, a temperature, and a charging voltage of the battery detected by the sensor, the voltage output mode is in response to the SOC and the temperature of the battery, wherein the output voltage of the generator is substantially inversely proportional to the temperature of the battery.

7. A generator control system that provides generator control for a vehicle power system, comprising:
   a battery;
   a generator that outputs power to charge the battery, the generator operable in one of two modes including a HI voltage output mode and a LO voltage output mode;
   a sensor that detects a state of charge (SOC) value, a health value, a voltage, a current, a temperature, and a charging voltage of the battery; and
   a controller that controls a voltage output mode of the generator in response to at least one of a state of charge (SOC) value, a health value, a voltage, a current, a temperature, and a charging voltage of the battery detected by the sensor, the voltage output mode is in response to the SOC and the temperature of the battery, wherein the controller provides a control signal to the generator based upon the SOC detected by the sensor, said control signal instructing the generator to operate in a selected one of the two modes when the SOC is outside a determined range,
   wherein the output voltage of the generator is substantially inversely proportional to the temperature of the battery.

8. In a vehicle having an engine that drives an electric power generator arranged to selectively provide electric power to an electrical load of the vehicle and to selectively charge a battery of the vehicle, a method for controlling a voltage output mode of the generator comprising:
   determining a state of charge (SOC) value, a health value, a voltage, a current, a temperature, and a charging voltage of the battery in the vehicle with a sensor;
   receiving at a controller from the sensor the state of charge (SOC), the health valve, the voltage, the current, the temperature and the charging voltage of the battery; and
   controlling a voltage output mode of the generator with the controller in response to at least one of a state of charge (SOC) value, a health value, a voltage, a current, a temperature, and a charging voltage of the battery detected by the sensor, the voltage output mode is in response to the SOC and the temperature of the battery, wherein controlling the voltage output mode includes: compelling the generator to operate in a selected one of a HI voltage output mode and a LO voltage output mode when the SOC is outside a determined range,
   wherein the step of compelling comprises:
      comparing the SOC to a first predetermined fixed threshold and a second predetermined fixed threshold, said first predetermined fixed threshold being greater than said second predetermined fixed threshold; and
      compelling the generator to operate in the LO voltage output mode if the SOC is greater than the first predetermined fixed threshold, and compelling the generator to operate in the HI voltage output mode if the SOC is less than the second predetermined fixed threshold.

9. The method of claim 8, wherein the controller utilizes a charge/discharge algorithm and a charging voltage value to output a control signal the generator.

10. The method of claim 8, wherein the mode selected is based at least in part upon a vehicle fuel economy value and an engine friction value.

11. The method of claim 8, wherein the difference between the HI mode and the LO mode is approximately 1.7 volts.

12. The method of claim 8, wherein the slew rate between the HI mode and the LO mode is about 2 volts/second.

13. The method of claim 8, wherein the first predetermined fixed threshold is in an approximate range of between 98% to 110%.

14. The method of claim 8, wherein the output voltage of the generator is substantially inversely proportional to the temperature of the battery.

15. A system that provides generator control for a vehicle power system, comprising:
   a battery;
   a generator that outputs power to charge the battery;
   a sensor that detects a state of charge (SOC) value, a health value, a voltage, a current, a temperature, and a charging voltage of the battery; and
   a controller that controls a voltage output mode of the generator in response to at least one of a state of charge (SOC) value, a health value, a voltage, a current, a temperature, and a charging voltage of the battery detected by the sensor, the voltage output mode is linearly related to the SOC and the temperature of the battery, wherein the controller employs a control signal to select the voltage output mode of the generator from a plurality of finite voltage states, and wherein the control signal instructs a voltage offset from a predetermined value based at least in part on the SOC value, and wherein the voltage output of the generator is selected from a plurality of finite voltage states based on one or more of a state of charge (SOC) value, a health value, a voltage, a current, a temperature, and a charging voltage of the battery detected by the sensor, wherein the generator is operable in one of two modes including a HI voltage output mode and a LO voltage output mode and the controller instructs the generator to operate in a selected one of the two modes when the SOC is outside a determined range, wherein controller instructs the generator to operate in the LO voltage output mode when the SOC is above a first predetermined fixed threshold and instructs the generator to operate in the HI voltage output mode when the SOC is below a second predetermined fixed threshold, said first predetermined fixed threshold being greater than said second predetermined fixed threshold.

16. The system according to claim 15, wherein the system is employed in a vehicle, the voltage output mode is selected based at least in part upon fuel economy of the vehicle or friction of a vehicle engine.

17. The system according to claim 15, wherein the difference between a first mode and a second mode is about 1.7 volts.

18. The system according to claim 15, wherein the control signal instructs the selection of a predetermined voltage output mode value, the predetermined value is based at least in part upon a battery chemistry and/or a battery condition.

19. The system according to claim 15, wherein the controller employs a control signal to select the voltage output of the generator.

20. The system according to claim 15, wherein the controller determines a slew rate of changes to the voltage output of the generator.

21. The system of claim 15 wherein an output voltage of the generator is inversely proportional to the temperature of the battery.

* * * * *